United States Patent [19]

Sullivan et al.

[11] Patent Number: 5,292,430
[45] Date of Patent: Mar. 8, 1994

[54] OIL SPILL RECOVERY AND STORAGE SHIP

[75] Inventors: John L. Sullivan, Rossmoor; David B. Sucharski, Irvine; Harry G. Kumpis, Fountain Valley, all of Calif.

[73] Assignee: Atlantic Richfield Company, Los Angeles, Calif.

[21] Appl. No.: 25,911

[22] Filed: Mar. 3, 1993

Related U.S. Application Data

[63] Continuation of Ser. No. 798,469, Nov. 26, 1991.

[51] Int. Cl.$^5$ ................ B01D 17/02; B01D 17/12
[52] U.S. Cl. ..................... 210/121; 114/74 R; 210/242.3; 210/923; 405/65
[58] Field of Search .............. 210/242, 3, 248, 776, 210/923, 121, 122, 170; 405/63, 65, 70, 71, 68; 114/74 R, 256

[56] References Cited

U.S. PATENT DOCUMENTS

| | | | |
|---|---|---|---|
| 61,880 | 2/1867 | Serrell | 210/242.3 |
| 3,348,690 | 10/1967 | Cornelissen | 210/292.3 |
| 3,818,708 | 6/1974 | Benson | 405/65 |
| 3,906,732 | 9/1975 | Tedeschi | 405/65 |
| 4,120,793 | 10/1978 | Strain | 210/923 |
| 4,257,889 | 3/1981 | Wober et al. | 210/242.3 |
| 4,399,040 | 8/1983 | Ayers et al. | 210/242.3 |
| 5,047,156 | 9/1991 | Sullivan | 210/242.3 |
| 5,194,151 | 3/1993 | Broussard | 210/242.3 |

FOREIGN PATENT DOCUMENTS

| | | | |
|---|---|---|---|
| 52-5180 | 1/1977 | Japan | 210/242.3 |
| 2182260 | 5/1987 | United Kingdom | 210/242.3 |

*Primary Examiner*—Joseph W. Drodge
*Attorney, Agent, or Firm*—Michael E. Martin

[57] ABSTRACT

An oil recovery and storage ship having a general tank configuration of a conventional crude oil carrier is modified by providing inlet doors along opposite sides of the ship and a deployable floating boom arrangement for maximizing the floating oil gathering swath. The side inlet doors open into sluice or sea-calming compartments which have adjustable weir doors opening into primary separation tanks on port and starboard sides. Adjustable weir doors open from the primary separation tanks into a secondary separation tank. A selected number of cargo tanks are interconnected by conduits which permit the flow of liquid from one tank to the next in a series or cascade manner to decant oil from oily water and to discharge substantially oil-free water overboard from the last tank in the cascade. The ship may be used as a conventional liquids carrier when not required for oil spill recovery operations.

8 Claims, 7 Drawing Sheets

OIL SPILL RECOVERY AND STORAGE SHIP

This application is a continuation of application Ser. No. 07/798,469, filed Nov. 26, 1991.

BACKGROUND OF THE INVENTION

1. Field of the Invention

The present invention pertains to a large, self-contained and self-propelled oil spill recovery and storage ship for recovering relatively large quantities of oil or other floating liquid pollutants as would be encountered in a large-scale marine oil spill, well blow-out or pipeline rupture.

2. Background

As described in U.S. Pat. No. 5,047,156 issued Sep. 10, 1991, to John L. Sullivan and assigned to the assignee of the present invention, several proposals for oil spill recovery ships have been disclosed in the prior art including those described in U.S. Pat. Nos. 3,690,464 to Heinicke, 3,744,257 to Spanner, 3,847,816 to DePerna, 3,884,807 to Heddon, 3,929,644 to Fletcher, 3,966,615 to Petchul et al, 4,033,876 to Cocjin et al, 4,067,811 to Dallamore, 4,120,793 to Strain, 4,257,889 to Wober et al, 4,308,140 to Pierson, Jr., and 4,653,421 to Ayers. These patents disclose various systems, some of which are alleged to be capable of open ocean recovery of floating oil.

The above-mentioned patent to Sullivan describes a large-scale oil recovery vessel having opposed bow doors which open to allow oily water to enter a sluiceway for skimming oil from the water by the adjustment of a weir disposed in the sluiceway. The ship described in the patent application also includes an improved storage and decanting system. This vessel is capable of ingesting and processing large quantities of oil-covered sea water wherein the oil layer may be up to several inches thick and wherein the sea state may be something greater than calm during recovery operations.

Experience with prior art oil recovery methods and devices has revealed that a ship capable of recovering large quantities of oil must also be capable of storage of large quantities of oil in order to effectively recover a spill before significant environmental damage occurs. In this regard, shipboard oil and water handling facilities should be arranged such that a minimal amount of mixing of water and oil occur. If this objective is not achieved, the oil separation and storage capacity is severely limited even in a large vessel such as a very large crude carrier.

Although the recovery vessel described in U.S. Pat. No. 5,047,156 has significant separation and storage facilities, it has been determined that a wider swath of oil should be recovered with each pass of the vessel through the oil slick than is typically easily achieved with a vessel having the bow door and booming arrangement described in the aforementioned patent application. Just as important, perhaps, is the requirement that the vessel, when not being used for oil spill recovery and storage, be capable of serving as a liquids carrier in commercial trade, or at least as a floating storage vessel. In this regard, modification of conventional liquids carriers as provided for in the aforementioned patent application is not as effective as a modification of an existing or conventional liquids carrier in accordance with the present invention.

Accordingly, it has been determined that it is important to be able to efficiently convert a conventional liquids carrier having multiple liquid cargo and ballast tanks to an effective oil spill recovery and storage ship while minimizing the structural modification to the ship. Concomitantly, it is important to provide an effective oil recovery system which (1) will minimize the amount of oily water which must be handled by the ship, (2) is capable of recovering relatively large spills in the open ocean as well as in more protected waters, and (3) is capable of settling relatively large quantities of oily water to allow gravitational separation before final processing and storage of the oil.

The present invention meets the desiderata mentioned herein in accordance with the summary and detailed description set forth below.

SUMMARY OF THE INVENTION

The present invention provides an oil recovery and storage ship for recovering relatively large quantities of crude oil or petroleum products as well as similar liquid pollutants floating in the open ocean or other waterways.

In accordance with an important aspect of the present invention, a large-scale oil spill recovery ship is provided having the capability of processing large volumes of oil-covered seawater which are taken on board the ship through side doors in the hull of the ship, preferably along both sides of the ship.

In accordance with another important aspect of the invention, there is provided a ship which is capable of processing large quantities of oil-covered seawater while minimizing the mixing of the oil with the intake seawater through a system of skimming weirs and settling chambers or tanks. In this way, the volume of oily liquid which requires further treatment, such as by decanting, is minimized.

In accordance with yet another important aspect of the present invention, an oil spill recovery system is provided for a large-scale oil recovery ship having oil-water inlet doors disposed along the sides of the ship's hull and including a unique oil-gathering boom arrangement stowable on the ship and operable to provide a wide oil recovery swath during operation of the ship.

Still further in accordance with the present invention, an oil spill recovery and storage ship is provided which is uniquely adapted from a liquids carrier ship having plural cargo tanks and wherein, when the ship is not being used as a spill recovery and storage ship, it may be used in liquids carrier service.

Still further in accordance with the present invention, a large-scale commercial oil tanker ship is provided which is relatively easily converted from a multiple cargo tank ship to provide plural primary and secondary oil separation chambers together with decanting and storage chambers or tanks arranged in such a way as to provide for effective oil recovery and storage while minimizing the modification of the ship so that it may also be used in conventional liquids carrier service.

The above-noted features and superior aspects of the present invention, together with other advantages thereof, will be further appreciated by those skilled in the art upon reading the detailed description which follows in conjunction with the drawings.

DESCRIPTION OF A PREFERRED EMBODIMENT

In the description which follows, like parts are marked throughout the specification and drawing with the same reference numerals, respectively. The drawing figures are not necessarily to scale and certain features are shown in some views but not others or in somewhat schematic or generalized form in the interest of clarity and conciseness.

Figures 1, 8:
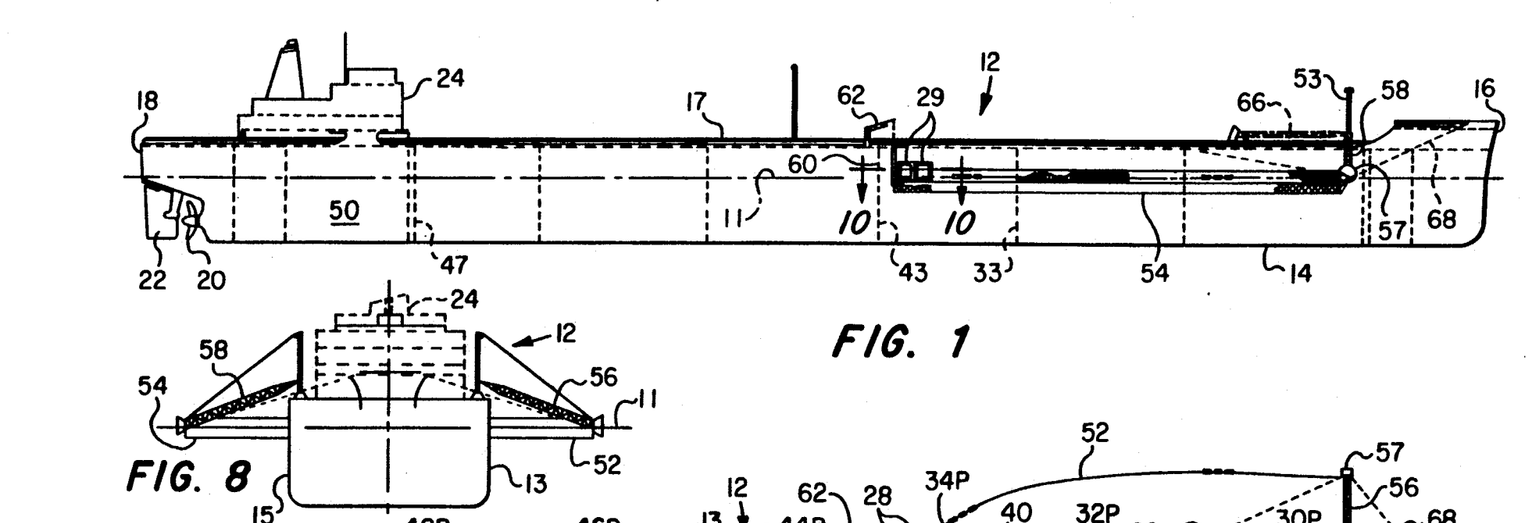
FIG. 1 is a side elevation of an oil recovery and storage ship in accordance with the present invention.
FIG. 8 is a front view of the ship illustrated in FIGS. 1 and 2.
Figure 2:
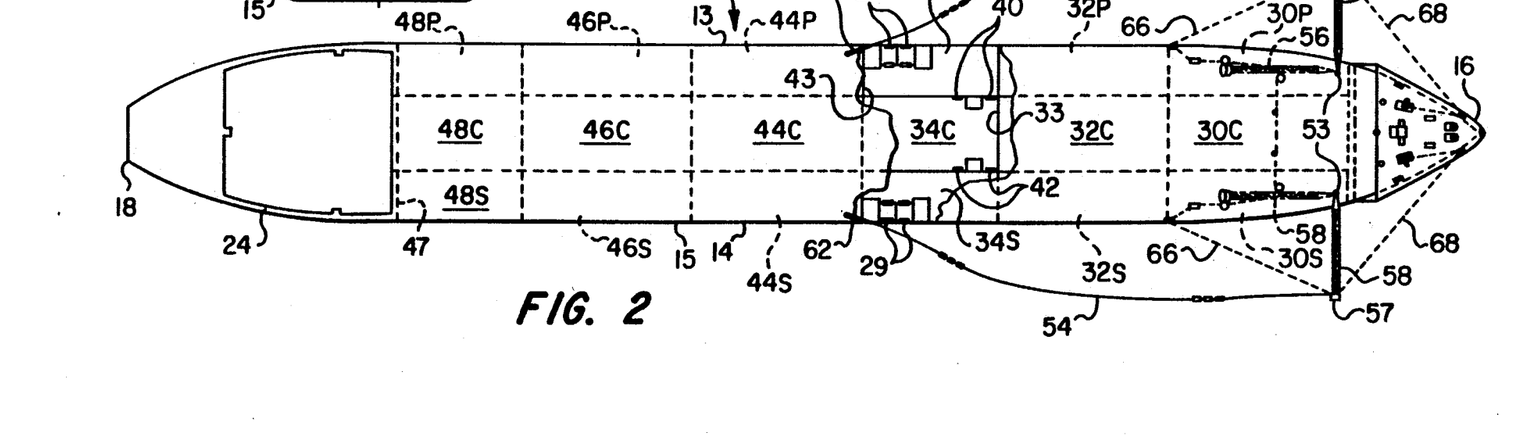
FIG. 2 is a plan view of the ship illustrated in FIG. 1.

Referring to FIGS. 1, 2 and 8, there is illustrated a substantially conventional ocean-going liquids carrier ship or "tanker", generally designated by the numeral 12. The ship 12 has been adapted in accordance with the present invention to recover substantial quantities of spilled crude oil or the like in the open ocean or other waterways, protected or not. The ship 12 may, for example, be a modified crude carrier of a 70,000 dwt class such as the SS Prudhoe Bay or SS Sag River, both operated by ARCO Marine, Inc., a subsidiary of the assignee of the present invention. The ship 12 includes a conventional monohull 14 having a bow 16, and stern 18 with a conventional propulsion system driving a single screw propeller 20 and steerable by a conventional rudder 22. The ship 12 may also include retractable or built-in side thrusters, not shown, for maneuvering the ship. A conventional deckhouse 24 is disposed aft. Opposite longitudinal sides of the hull 14 are designated by the numerals 13 and 15, respectively, and are each provided with closable ports or openings 28 and 29 which will be described in greater detail in conjunction with later-described drawing figures.

The hull 14 is divided into a series of internal tanks or compartments for receiving and discharging ballast water and liquid cargo such as crude oil. For example, in a preferred arrangement of tanks or compartments, there are provided forward cargo tanks 30P, 30S and 30C. Moving aft these tanks are followed by cargo tanks 32P, 32S and 32C. Somewhat amidships are tanks 34P and 34S into which the openings 28 and 29 are adapted to penetrate to receive oil and some oily water from the ocean surface 11 when the ship is ballasted to the depth indicated by the surface 11 in relation to the ship's main deck 17. As indicated in FIG. 2, a second set of internal openings 40 and 42 are formed in opposed longitudinal bulkheads forming tank walls 36 and 38, for discharging liquid into a center tank 34C. Aft of the primary separation tanks 34P, 34S and the secondary separation tank 34C is a further series of cargo tanks 44P, 44S and a center tank 44C. The ship 12 is further divided by suitable transverse and longitudinal bulkheads into two more sets of tanks, designated by the numerals 46P, 46S, 46C, 48P, 48S and 48C. A conventional machinery space 50 is disposed aft of a bulkhead 47 delimiting the tanks 48P, 48S and 48C.

As shown in FIGS. 1, 2 and 8, the ship 12 is provided with portable oil-gathering booms 52 and 54 which may be deployed during an oil spill recovery operation to gather oil floating on the surface 11 to flow into and through the openings 28 and 29 and into the tanks 34P and 34S for further treating operations to be described herein. The booms 52 and 54 are deployable in such a way that the forward distal ends of the booms are connected to opposed outrigger arms 56 and 58, respectively, which may be pivoted from a stowed position, indicated by the dashed lines in FIGS. 1 and 2, to the deployed position indicated in the drawing figures. The distal ends of the arms 56 and 58 are provided with float members 57 for supporting the booms 52 and 54 and the arms 56 and 58, respectively. The arms 56 and 58 are connected to respective kingposts 53 having suitable tackle, not shown, connected thereto for moving the arms between stowed and deployed positions. The opposite ends of the booms 52 and 54 are suitably connected to the sides 13 and 15 of the ship 12 just aft of the openings 28 and 29 at respective boom anchor beams 60, illustrated in FIGS. 1 and 3.

Figure 3:
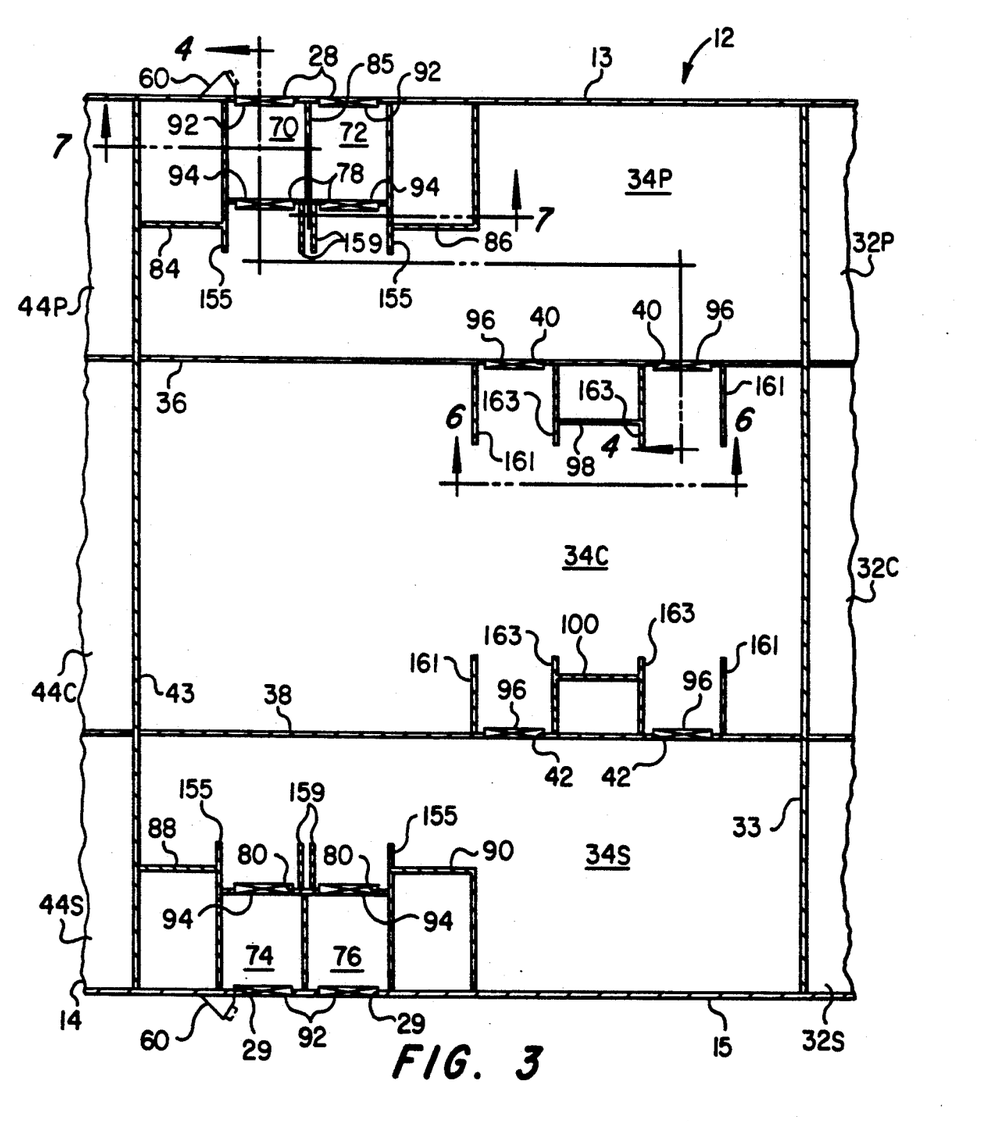
FIG. 3 is a detail plan view on a larger scale showing the arrangement of the inlet doors, and primary and secondary skimming weirs for the ship.
Figure 10:
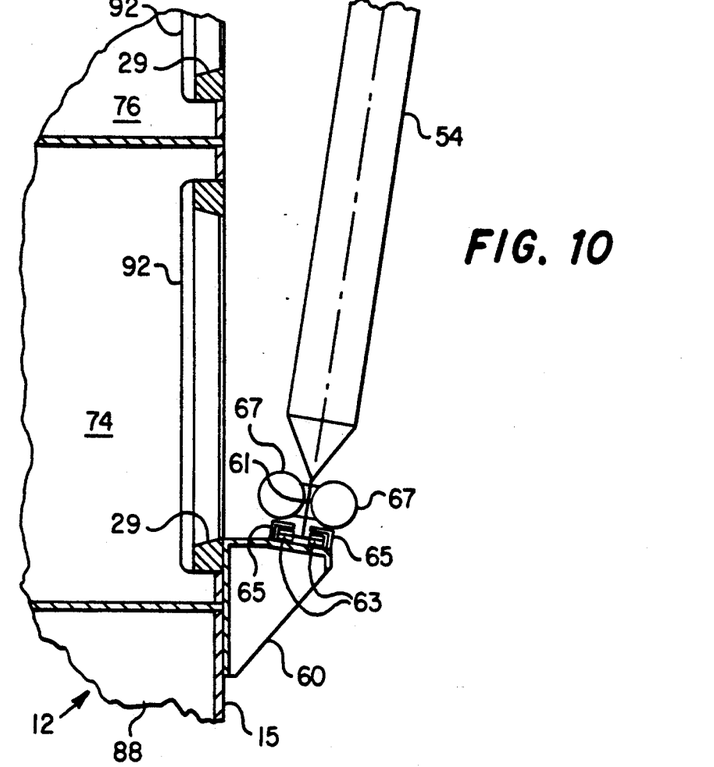
FIG. 10 is a detail view taken along line 10—10 of FIG. 1.

FIG. 10 shows more detail of the anchor means for the booms 56 and 58. The boom anchor beams 60 are arranged to extend generally vertically along the sides 13 and 15 of the hull 14, as shown in FIG. 1 and FIG. 3. Referring further to FIG. 10, by way of example, the boom 54 is illustrated connected to the anchor beam 60 by way of a boom car 61 having opposed rollers 63 which ride along the beam 60 and are retained in a channel formed by opposed members 65, as illustrated. The boom car 61 also includes buoyancy members 67 connected thereto for supporting the boom car and the end of the boom 54 attached to the boom car. Accordingly, the boom 54 may be permitted to float at its anchor point on the water surface 11 directly adjacent the aft opening 29. The boom 52 is similarly connected to the side 13 of the ship.

Boom cranes 62 are mounted on the deck 17 for raising and lowering the ends of the booms 52 and 54, respectively, which are disposed adjacent to the openings 28 and 29, respectively. The booms 52 and 54 may be of a conventional floating inflatable tube type or the booms may be of the type described in U.S. Pat. No. 5,000,616 to Bell, et al., and assigned to the assignee of the present invention Conventional deck machinery may be utilized to operate the boom cranes 62 and the arms 56 and 58 to move between positions to stow the booms 52 and 54 on the deck 17 or to deploy the booms into the working positions illustrated. In the working position of the booms 52 and 54, a substantially wider oil-gathering swath for channelling oily water toward the openings 28 and 29 may be obtained than without the provision of the booms 52 and 54.

Referring now to FIG. 3, there is illustrated on a larger scale the arrangement of the openings 28 and 29 in the respective sides 13 and 15 of the ship 12. As indicated in FIG. 3, the cargo tanks 32P, 34P and 44P as well as the other corresponding sets of tanks are separated by respective transverse bulkheads, including bulkheads 33 and 43, while the longitudinal bulkheads 36 and 38 separate the series of "P" tanks and "S" tanks from the series of center or "C" tanks.

Figure 4:
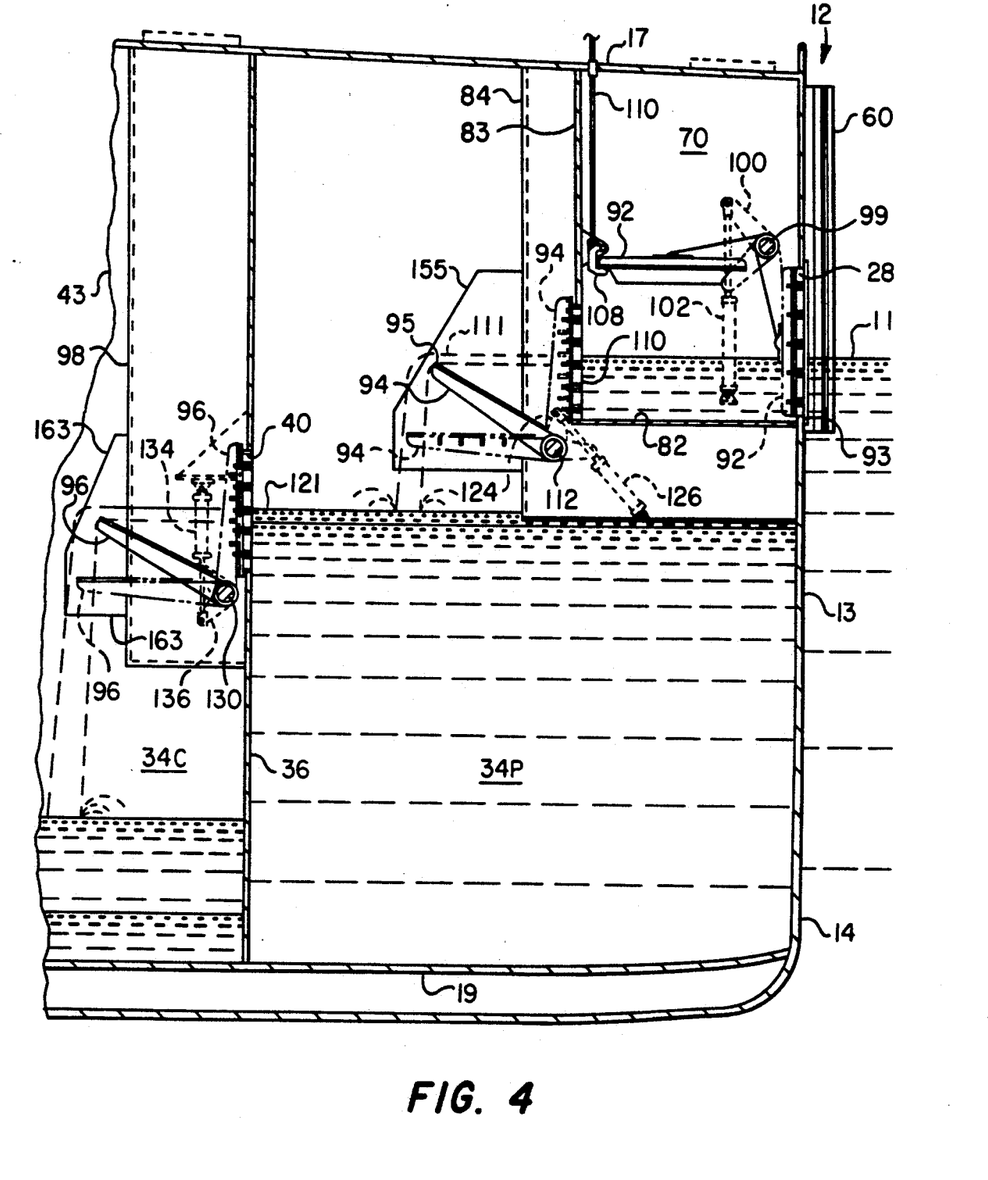
FIG. 4 is a section view taken generally along the line 4—4 of FIG. 3.

The openings 28 and 29 in the respective outer sidewalls 13 and 15 of the hull 14 provide access to respective sluice chambers or sea-calming compartments 70, 72, 74 and 76, as illustrated. The compartments 70 and 72 are each provided with inner openings 78 which open into the tank 34P, and the compartments 74 and 76 are provided with respective openings 80 into the tank 34S. As illustrated in FIG. 4, the compartment 70, by way of example, includes a bottom wall 82 and an inner sidewall 83 forming an enclosure together with the deck 17 and the outer sidewall 13 of the hull 14. A common wall 85 is interposed between compartments 70 and 72.

Referring again to FIG. 3, the ship 12 includes machinery enclosures 84 and 86 formed adjacent the sluice compartments 70 and 72 and machinery enclosures 88 and 90 formed adjacent to the compartments 74 and 76. The enclosures 84, 86, 88 and 90 are disposed for enclosing suitable actuating mechanism for actuating closeable outer hull access doors and weir doors, respectively. For example, the openings 28 are closeable by a pair of outer hull doors 92 while the openings 29 are also closeable by a second pair of outer hull doors 92, respectively. The openings 78 and 80 are closeable by suitable adjustable weir doors 94 which will be described in further detail herein.

As previously mentioned, the longitudinal bulkheads 36 and 38 are provided with the openings 40 and 42, respectively, which open from the tanks 34P and 34S into the center tank 34C. The openings 40 and 42 are also closeable by suitable weir doors 96 which may be operated to move between open and closed positions by machinery disposed in suitable machinery enclosures 98 and 100, shown in FIG. 3.

Figure 7:
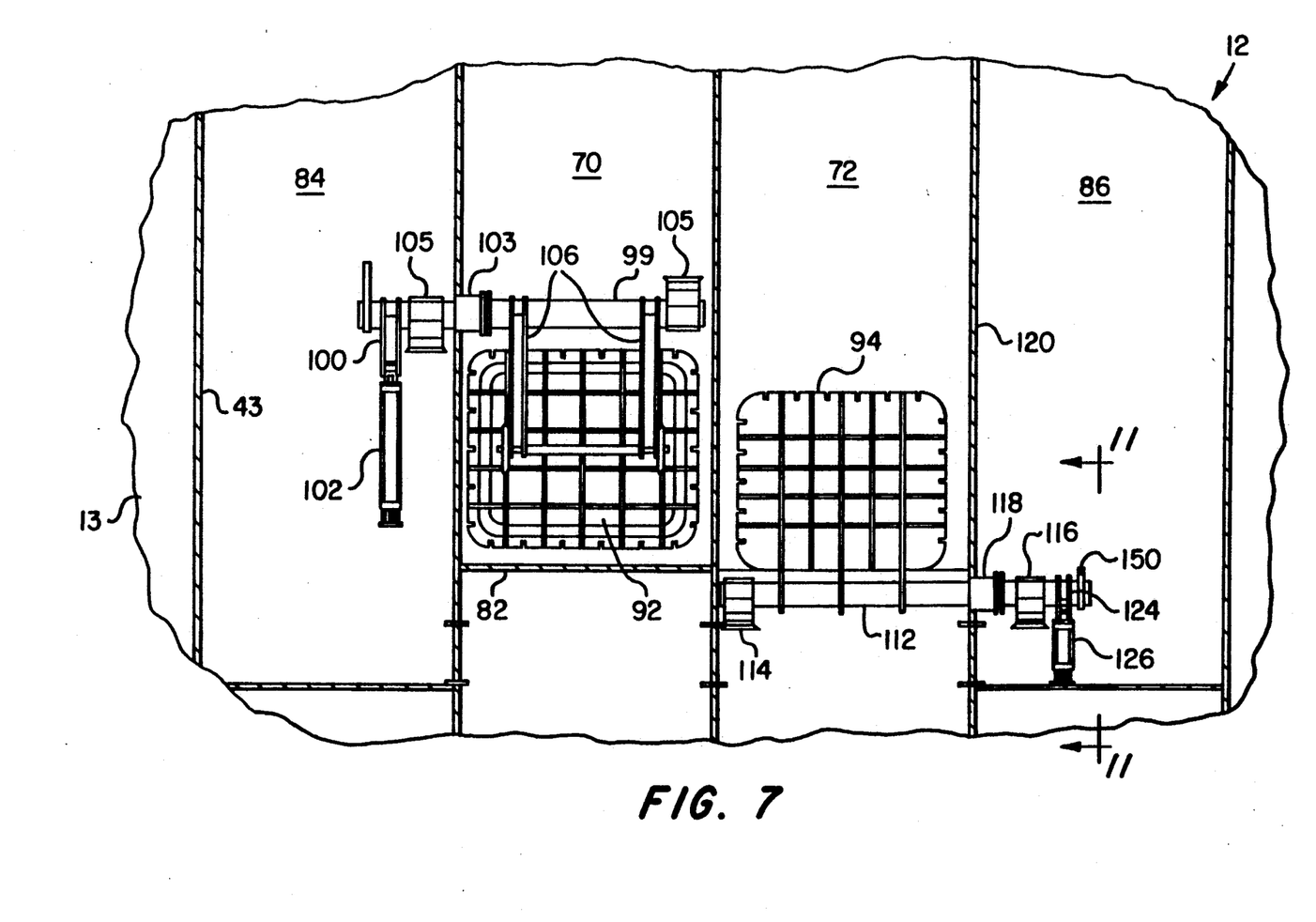
FIG. 7 is a view taken along line 7—7 of FIG. 3 illustrating the arrangement of one of the outer hull doors and one of the primary weir doors.

Referring now to FIG. 4, by way of example, the sluice compartment 70, the tank 34P, and a portion of the tank 34C are illustrated together with one of the outer hull doors 92, one of the weir doors 94 and one of the weir doors 96. As illustrated in FIG. 4, each of the outer hull openings is provided with a door frame 93 and a support shaft 99 for pivotally supporting the doors 92 for movement between open and closed positions shown. A door shaft crank arm 100 is disposed in the machinery enclosure 84 along with a hydraulic actuator 102, see FIG. 7 also, for actuating the door 92 to move between open and closed positions. As shown in FIG. 7, the crank arm 100 is connected to the shaft 99 which is supported in suitable spaced apart bearings 105. The shaft 99 also extends through a suitable seal assembly 103. Depending support brackets 106 are connected to the shaft 99 and to the door 92. The door 92 and associated frame 93 may be provided with suitable clamping mechanisms of conventional shipboard design for locking the door in its closed position. Alternatively, the doors 92 may each also be latched in their open positions, as illustrated by way of example in FIG. 4, by suitable latch member 108 which is connected to an actuating rod 110 extending upward through the sluice compartment 70 to the deck 17 for actuation to release the door 92 from its open position.

As shown in FIGS. 4 and 7, the weir doors 94 are each closeable against a door frame 110 to prevent flow of liquid from the sluice compartments 70, 72, 74 and 76, respectively, into the respective tanks 34P and 34S. The doors 94 are each pivotally supported on an actuating shaft 112, see FIG. 7 by way of example, which is supported on spaced apart bearings 114 and 116. A suitable shaft seal 118 is supported on a vertical sidewall 120 defining, in part, the sluice compartment 72, for example. Each shaft 112 is connected to a suitable crank arm 124, see FIGS. 4 and 7, which is connected at its distal end to a hydraulic cylinder type actuator 126 disposed in the compartment 86, as shown by way of example in FIG. 7, for moving the doors 94 between full open, partially open and closed positions, respectively. In like manner, a hydraulic cylinder type actuator 126 is disposed in each of the compartments 84, 88 and 90 also for actuation of the respective doors 94 which may close each of the openings 78 and 80.

Figure 11:
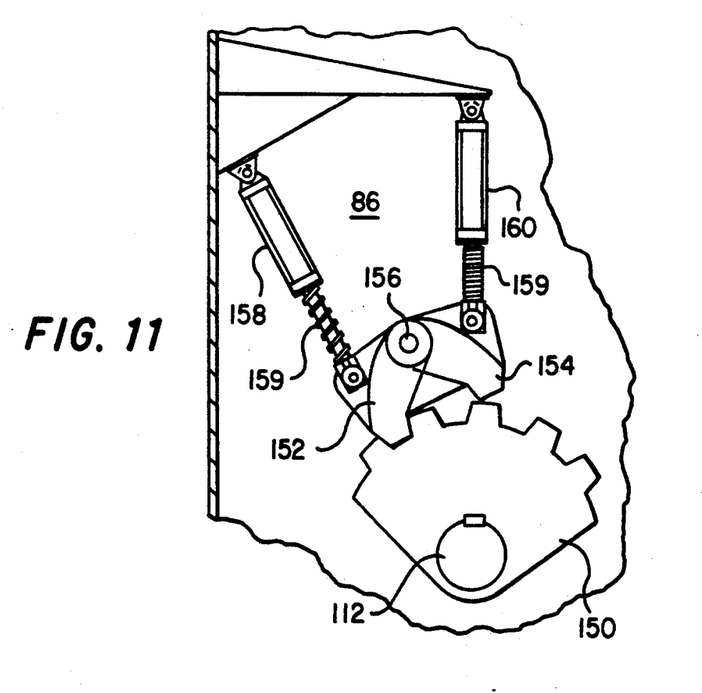
FIG. 11 is a detail view taken along line 11—11 of FIG. 7.

Referring now to FIGS. 4 and 11, the doors 94 are each adapted to be positioned in selected plural partially open positions between fully opened and fully closed positions, as illustrated in FIG. 4. One of the doors 94 is shown in a selected partially opened position in FIG. 4 which is controlled by a door-positioning mechanism illustrated in FIG. 11. Each of the pivot shafts 112 for the doors 94 has mounted thereon a toothed quadrant 150 which is operable to be engaged by opposed pawls 152 and 154 pivotally supported on a pivot shaft 156 which is suitably supported in the enclosure 86, for example. The pawls 152 and 154 are each movable between quadrant-engaging positions and positions clear of the quadrant by respective hydraulic cylinder-type actuators 158 and 160 which are each provided with a coil-type biasing spring 159 disposed around their respective piston rods. The actuators 158 and 160 are also disposed in the enclosure 86, for example. Actuation of the cylinder actuators 158 and 160 may be carried out in timed relation to each other to permit positioning the door 94 in a selected open position, as illustrated in FIG. 4, such as to permit skimming an oil layer 111 off of the surface 11 of the body of water in which the ship 12 is disposed and as indicated in FIG. 4 without ingesting a substantial amount of water into the tank 34P. The positions of doors 94 may, of course, be adjusted by movement of the shaft 112 and the quadrant 150 through operation of the actuator 126 to a different selected position to control the skimming action.

As shown in FIGS. 3 and 4, spaced apart baffle plates 155 and 159 are disposed adjacent to the sides of the doors 94 and serve to channel the flow of liquid over the edge 95 of the door opposite the pivot point provided by the shaft 112. In this way, minimal leakage of water around the side edges of the doors occurs during operation in the partially opened positions thereof. In like manner, the doors 96 are each flanked by a pair of spaced apart baffle plates 161 and 163, FIG. 3 and FIG. 4, which serve the same function with respect to positioning of the door 96 as will be explained in further detail herein.

Figure 6:
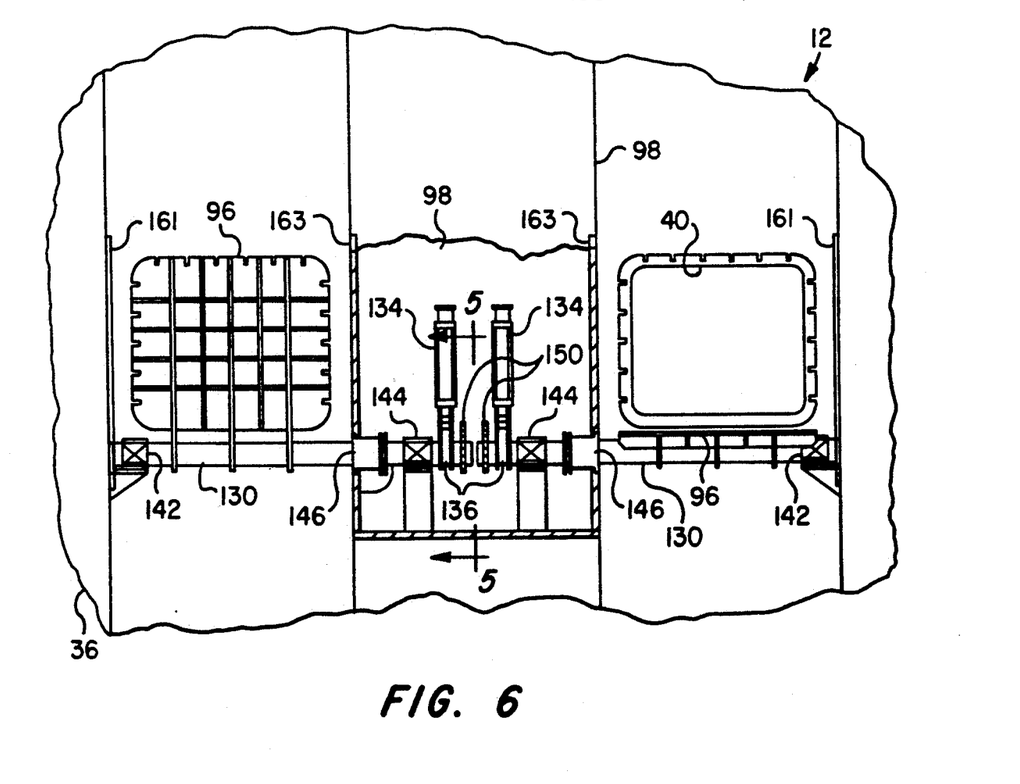
FIG. 6 is a view taken along line 6—6 of FIG. 3 showing the arrangement of two of the secondary weir doors and their actuating mechanisms.

Referring now to FIGS. 4 and 6, each of the doors 96 is supported on a pivot shaft 130 for movement between a closed position and a full or partially open position to permit flow of liquid from the tanks 34P and 34S into the tank 34C. As illustrated in FIG. 4, the elevation of the doors 96 with respect to the doors 94, using the tank bottom wall 19 as a reference, is closer to the tank bottom wall. As shown in FIGS. 4 and 6, the doors 96 are moved between open and closed positions by hydraulic cylinder type actuators 134 which have their piston rods connected to crank arms 136 of the respective actuating shafts 130. The actuators 134 are disposed in the enclosures 98 and 100, respectively, the enclosure 98 being shown by way of example in FIGS. 4 and 6. As shown in FIG. 6, the shafts 130 are each supported on spaced apart bearing supports 142 and 144 and the shafts 130 extend through suitable packing glands or seal assemblies 146 to prevent incursion of liquid into the interior of the enclosure 98.

Figure 5:
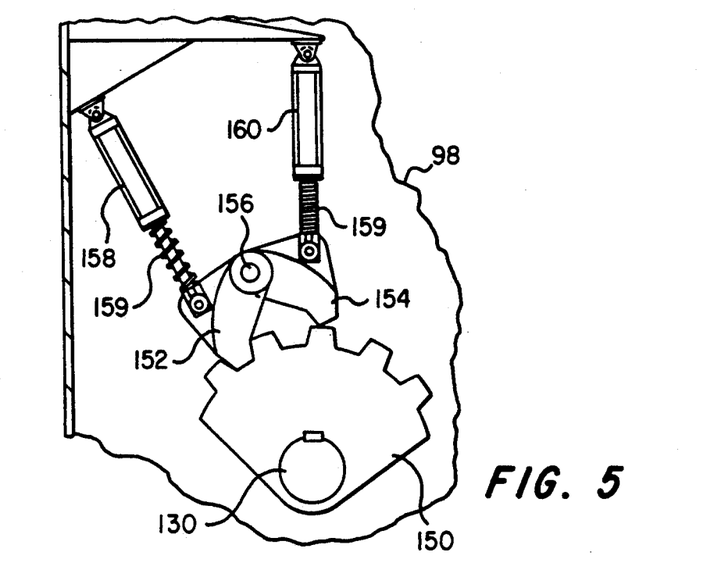
FIG. 5 is a detail view of a weir door positioning mechanism taken along line 5—5 of FIG. 6.

Referring to FIGS. 5 and 6, the doors 96 are adapted to be positioned in selected partially opened positions between the fully open and closed positions shown in FIGS. 4 and 6. Each of the shafts 130 is also provided with a toothed quadrant 150, FIG. 5, disposed on the end of the shaft within the enclosure 98, or the enclosure 100 as the case may be, which is operable to be engaged by opposed pawls 152 and 154 which are pivotally supported on a pivot shaft 156 and are each moveable between quadrant-engaging positions and positions clear of the quadrant by respective hydraulic cylinder-type actuators 158 and 160, also disposed within the enclosure 98, or 100. Accordingly, the doors 96 may be moved to a selected partially open position intermediate the fully open and closed positions to adjust the weir height to skim a layer of oil off of the liquid in the tanks 34P or 34S so that a concentration of primarily oil with only a little water is allowed to pass into the tank 34C.

Accordingly, in the operation of the ship 12 to recover oil from the sea, the ship would be ballasted to a depth such that the oily water surface 11 would be above the lower edge of the door frame 93 a selected depth so that, upon opening of the doors 92, substantially the entire layer of oil 111 and possibly a little water, depending on sea state, would enter the sluice compartments 70, 72, 74 and 76. Upon entry of liquid into the sluice compartments 70, 72, 74 and 76 in a roiled sea state, the compartments would provide for some settling and calming of the oily water. The weir doors 94 are also actuated to move to at least a partially open position to allow at least oil to enter the primary separation tanks 34P and 34S, respectively. Entry of oily water into the tanks 34P and 34S comprises a first separation step wherein these relatively large tanks allow the water to settle and the oil to separate and float to the top of the liquid in the tanks. As the liquid level rises to the elevation of the openings 40 and 42, the doors 96 are selectively opened to allow skimming of an oil layer 121 off of the liquid in the tanks 34P and 34S and for substantially all of the separated oil to flow into the secondary separation tank 34C. The positions of the doors 94 and 96 are selected by energizing the actuators 134 and observing the position of the doors through a suitable remote indicator mechanism, not shown, and then actuating the actuators 158 and 160 to lock the doors in selected open or partially open positions. The positions of the doors 94 may, of course, be adjusted as the working draft of the ship 12 is adjusted during operation, if required, and the positions of the doors 94 and 96 may also be adjusted for the thickness of the oil layers and 121 on the water in the sluice compartments and the separation tanks 34P and 34S, respectively. It is contemplated that the ship 12 would operate at substantially constant draft throughout the oil recovery process.

Prior to opening the doors 92, the booms 52 and 54 would be deployed into the positions shown in FIGS. 1 and 2 to assist in gathering oil floating on the surface 11 for movement toward the openings 28 and 29. The width of the gathering swath provided by the booms 52 and 54 could, for example, be on the order of about 100 feet for each boom. In a ship having a beam of about 100 feet, the overall width of the swath provided by maneuvering the ship 12 generally forward through an area where oil is spilled on the water surface would then, of course, be on the order of about 300 feet.

Figure 9:
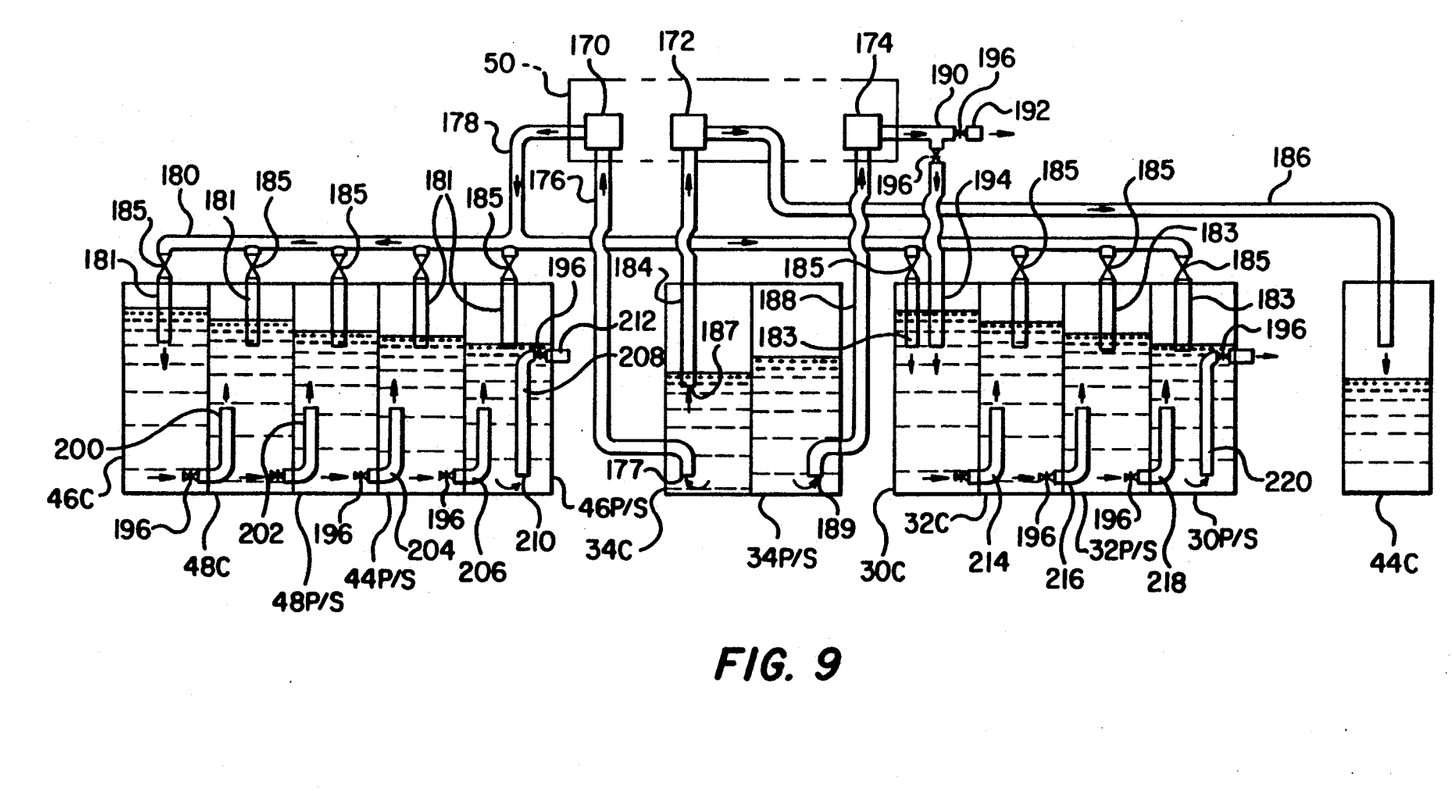
FIG. 9 is a schematic diagram showing the decanting sequence for flowing oily water through the decanting and storage tanks.

Referring now to FIG. 9, there is illustrated a schematic diagram of the tanks of the ship 12, together with the pump and piping arrangement which would provide for separating and decanting the oil from the water as it flows through the tank system. As illustrated in FIG. 9, the oil recovery ship 12 is provided with a plurality of pumps 170, 172 and 174 which may be located aft in the machinery space 50. The pump 170, for example, is connected to a suction conduit 176 which has an inlet 177 opening into the lower portion the tank 34C as indicated. The pump 170 is connected to a discharge conduit 178 which is connected to manifold conduits 180 and 182. The conduits 180 and 182 are also connected to plural branch discharge conduits 181 and 183 which open into the respective sets of tanks indicated in the diagram of FIG. 9. Remotely controllable shutoff valves 185 are interposed in each of the branch discharge conduits 181 and 183 for selectively controlling flow to the tanks from the pump 170. Accordingly, oily water may be drawn off of the bottom of the tank 34C and discharged into selected ones of the tanks indicated in the diagram. The valves 185 are opened and closed such that the oil-water mixture from tank 34C is forced to flow through the maximum number of tanks in a cascade or series arrangement until the respective tanks become filled with oil.

The pump 172 is connected to the tank 34C by way of a suction conduit 184 which is disposed in the tank to have an inlet end 187 above the inlet end 177 of the conduit 176 so as to withdraw from the tank 34C substantially oil only which is collected on top of the body of liquid in the tank. The pump 172 is connected to a discharge conduit 186 which discharges oil to storage tank 44C. Still further, the pump 174 is connected to an inlet conduit 188 having an inlet end 189 disposed only slightly above the bottom of the tanks 34P and 34S, which are shown for purposes of illustration only as one tank in the diagram of FIG. 9. The tanks 34P and 34S as well as the other sets of "P" and "S" tanks may, of course, be cross-connected by suitable cross-over conduits, not shown. Alternatively, the pump 174 could have branch conduits connected to the conduit 188 and extending into the respective tanks 34P and 34S. The pump 174 is connected to a discharge conduit 190 which has branches 192 and 194 connected thereto by suitable shut-off valves 196, respectively. Accordingly, substantially oil-free water may be discharged by the pump 174 directly overboard by way of the conduit 192 or oil-contaminated water may be discharged into the tank 30C by way of the conduit 194, as indicated. The valves 185 and 196 may, of course, be remotely controlled by hydraulic or electric controllers, not shown, using conventional valve actuator and control components. The aforementioned actuators for the outer hull doors and weir doors may also be controlled from a suitable control console, not shown, by conventional hydraulic control valves. The tanks shown schematically in FIG. 9 may also be connected to conventional liquid cargo loading and discharge piping and pumps, not shown, for loading the tanks during conventional liquid cargo operations, for unloading the tanks and for transferring liquids between selected ones of the tanks.

Referring further to the diagram of FIG. 9, it is indicated that the tank 46C is connected to the tank 48C by a conduit 200 having an entry at a low elevation in the tank 46C, an exit at an intermediate elevation in the tank 48C and the flow between the tanks being controlled by a remotely controllable valve 196. In like manner, the tank 48C is in communication with the tanks 48P and 48S, in effect, by a similar conduit 202 also arranged as indicated schematically in FIG. 9 and having flow between the tanks 48C and 48P, 48S controlled by a remotely controllable valve 196. Still further, the tanks 48P and 48S are in communication with the tanks 44P and 44S by way of a conduit 204 similar to the conduits 200 and 202 and having a valve 196 disposed to control the flow of fluid from the tanks 48P and 48S.

The tanks 46P and 46S are in communication with the tanks 44P and 44S by way of a conduit 206 having an inlet control valve 196 disposed at its inlet end. The tanks 46P and 46S have a discharge conduit 208 disposed therein with an inlet end 210 just above the bottom of the tanks 46P and 46S and a discharge portion 212 adapted to discharge liquid overboard of the ship 12. A control valve 196 is also interposed in the conduit 208. The relative levels of liquid in the tanks 46C, 48C, 48P and 48S, 44P and 44S, and 46P and 46S are normally as indicated in the diagram of FIG. 9 during decanting operations. As oil-contaminated water is discharged from the tank 34C into tertiary separation tank 46C, a level of liquid is maintained, as indicated, while allowing water to be drawn off of the bottom of the tank 46C to flow into the tank 48C and so on until oil has collected in the tanks 46C, 48C and so on to a depth which will cause substantial oil carryover into the next tank in the sequence.

Initially, only a relatively thin layer of oil would normally exist on the top of the liquid in each of the tanks while relatively oil-free water would be discharged overboard through the conduit 208. If the tank 46C becomes essentially completely filled with oil, the valve 185 leading to tank 46C would be closed so that an oil-water mixture is not discharged into tank 46C but bypasses that tank and is caused to flow into tank 48C through branch conduit 181. Accordingly, as each of the decanting tanks 46C, 48C, 48P and 48S, 44P and 44S become essentially full of oil, the liquid input to these tanks is switched to the next succeeding tank in the decanting sequence. Of course, the decanting steps are reduced in number as each of the tanks in the sequence becomes full of oil and is bypassed in the decanting process.

In like manner, the tanks 30C, 32C, 32P and 32S and 30P and 30S are interconnected by a series of conduits 214, 216 and 218, each provided with a flow control valve 196. These tanks are also interconnected to conduit 182 by branch conduits 183 and shutoff valves 185, respectively. The tanks 30P and 30S have a discharge conduit 220 similar to the conduit 208 with a control valve 196 interposed therein. Accordingly, oily water may be distributed by the pump 170 to the tanks 46C and 30C and the other interconnected tanks in the decanting cascade, simultaneously or selectively, for series or cascade decanting of the oil-contaminated water through the respective sets of tanks until the tanks in the sets become essentially full of oil, at which time recovery operations would cease.

The sequence of filling the tanks with oil would thus be generally as follows. Prior to commencing recovery operations, the tanks 30C, 30P, 30S, 32P, 32S, 44P, 44S, 46P, 46S, 48P, 48S and 48C would be at least partially full of ballast water (as required to bring the ship 12 to its desired working draft during oil recovery operations). Upon commencing recovery of oil by collection of oil into the tanks 34P and 34S and then 34C, the tank 44C would begin collecting oil in accordance with the operation of the pump 172. The collection process would then be progressive in the sets of tanks connected to the conduits 180 and 182 in accordance with the foregoing discussion. Upon reaching capacity, which for the S.S. Prudhoe Bay would be approximately 260,000 barrels of oil, the tanks 46C, 44C, 30C, 32C, 32P and 32S would be full of oil. The tanks 44P and 44S would be at least partially full of oil as would the tanks 48C, 48P and 48S. The tanks 46P and 46S as well as the tanks 30P and 30S would remain at least partially in ballast.

The materials and components utilized in converting a bulk liquids carrier such as a crude oil tanker to provide an oil recovery ship such as the ship 12 may be carried out utilizing conventional engineering materials and components which are commercially available, including the hydraulic actuators and the booms 52 and 54, unless the type of boom described in the aforementioned patent is utilized. Existing ships having a cargo tank arrangement generally along the lines of that described for the ship 12 may be converted to oil recovery and storage ships or newly constructed ships may utilize the unique features of the present invention. Although a preferred embodiment of the invention has been described in detail herein, those skilled in the art will recognize that various substitutions and modifications may be made to the ship 12 without departing from the scope and spirit of the invention as recited in the appended claims.

What is claimed is:

1. A seagoing oil recovery and storage ship for recovering relatively large quantities of oil or a similar pollutant disposed on the surface of the sea, said ship comprising:

a hull including a bow, and a stern, and opposed longitudinal sides;

means defining an opening in each of said sides of said hull at predetermined points between said bow and said stern;

means forming respective oil and water-receiving compartments adjacent said openings for receiving oil and water on or near the surface of the sea;

respective oil-gathering boom means connected to said ship for gathering oil to flow through said openings;

means for connecting one end of each of said boom means to said ship comprising a generally vertically extending guideway on each of said sides of said ship adjacent said opening;

buoyant car means disposed to float on the surface of the sea and for movement along said guideway as the draft of said ship changes relative to the surface of the sea, said buoyant car means being connected to said one end of said boom means, respectively; and moveable outrigger means respectively connected at one end to said ship and to the opposite ends of each of said boom means at respective points spaced from said one end of said outrigger means, respectively, and spaced longitudinally from said openings with respect to the length of said ship, for deploying said opposite ends of each of said boom means at a point spaced from said sides of said ship, respectively.

2. The ship set forth in claim 1 including:
buoyancy means respectively disposed on said outrigger means for at least partially supporting said outrigger means while said outrigger means has deployed said boom means at said points spaced from said sides of said ship.

3. The ship set forth in claim 1 including:
means for positioning said respective outrigger means in a stowed position on said ship.

4. A liquid cargo carrier ship adapted to be temporarily convertible to a seagoing oil recovery and storage ship for recovering relatively large quantities of oil or a similar pollutant disposed on the surface of the sea, said ship comprising a first set of tanks arranged seriatim fore and aft and disposed along both port and starboard sides of said ship and comprising at least one of liquid cargo tanks and ballast tanks, respectively, said first set of tanks being delimited by outer opposed longitudinal sides of said ship, respectively, longitudinal bulkheads extending at least partly the length of said ship and defining a second set of tanks comprising at least one of liquid cargo and ballast tanks disposed between said first set of tanks;

respective openings formed in each of said opposed longitudinal sides of said ship at predetermined points between the bow and the stern of said ship;

movable outer doors arranged for closing said openings during operation of said ship as a liquid cargo carrier;

oil and water receiving compartments disposed adjacent each of said openings in each of said opposed longitudinal sides for receiving oil and water on or near the surface of the sea through said openings, respectively;

each of said compartments having an inner wall and defining an opening into at least one tank, respectively, of said first set of tanks, said first set of tanks defining primary separation tanks;

first movable weirs operable for selectively closing said openings in said inner walls to isolate said primary separation tanks from said compartments, respectively, and operable during oil recovery operations to be moved to a position for controlling the flow of oil and water from said compartments, respectively, into said primary separation tanks;

openings formed in said longitudinal bulkheads, respectively, between said primary separation tanks and one tank of said second set of tanks, said one tank of said second set of tanks comprising a secondary separation tank;

second movable weirs operable to close said secondary separation tank from said primary separation tanks, respectively, and operable during oil recovery operations to be moved to a position for controlling the flow of oil from said primary separation tanks to said secondary separation tank; and conduits interconnecting said primary and secondary separation tanks with selected ones of said at least one of liquid cargo tanks and ballast tanks for transferring at least one of oil and an oil/water mixture from said primary and secondary separation tanks to said selected ones of said at least one of liquid cargo tanks and ballast tanks to further separate oil from water and to store oil therein which has been recovered from the sea.

5. The ship set forth in claim 4 including:
conduits interconnecting said selected ones of said at least one of liquid cargo tanks and ballast tanks for serial flow of water therethrough and a discharge conduit in communication with a last tank of said at least one of liquid cargo tanks and ballast tanks for discharging water overboard from said ship, said discharge conduit having an inlet disposed in said last tank near the bottom of said last tank.

6. The ship set forth in claim 4 wherein:
said second weirs are spaced longitudinally with respect to the length of said ship from said first weirs.

7. The ship set forth in claim 4 including:
actuators for positioning said first and second weirs, respectively, at selected positions for skimming oil off of the surface of the water in said compartments and said separation tanks, respectively, to permit oil to flow from said compartments to said primary separation tanks and from said primary separation tanks to said secondary separation tank.

8. The ship set forth in claim 4 including:
oil gathering booms connected at one end, respectively, to said ship for gathering oil to flow through said openings in said opposed longitudinal sides, respectively, said boom including connectors at said one end of said booms to connect said booms to said ship adjacent said openings and generally at said sides of said ship, and respective outriggers supported on said ship and connected to the opposite ends of said booms, respectively, said outriggers being spaced longitudinally from said openings with respect to the length of said ship for positioning said opposite ends of said booms spaced from the sides of said ship, respectively.

* * * * *